United States Patent

[11] 3,599,204

[72] Inventor John A. Severin
Dallas, Tex.
[21] Appl. No. 694,531
[22] Filed Dec. 29, 1967
[45] Patented Aug. 10, 1971
[73] Assignee Texas Instruments Incorporated
Dallas, Tex.

[54] TECHNIQUE FOR HIGH SPEED ANALOG-TO-DIGITAL CONVERSION
1 Claim, 4 Drawing Figs.

[52] U.S. Cl. .... 340/347 AD, 340/347 SH
[51] Int. Cl. .... H03k 13/02
[50] Field of Search .... 340/347

[56] References Cited
UNITED STATES PATENTS
3,259,896 7/1966 Pan .... 340/347
2,974,315 3/1961 Lebel et al. .... 340/347

*Primary Examiner*—Daryl W. Cook
*Assistant Examiner*—Charles D. Miller
*Attorneys*—Samuel M. Mims, Jr., James O. Dixon, Andrew M Hassell, Harold Levine, John E. Vandigriff, Rene E. Grossman and Richards, Harris & Hubbard

ABSTRACT: An analog signal is sequentially sampled and fed into a plurality of series connected identical encoder circuits. Each of the encoder circuits successively generates analog outputs representative of the sampled values of the analog signal. The encoder circuits also successively generate binary bit outputs representative of the relationship of each of the analog outputs to a preselected reference value. The binary bit outputs are stored in sequential order of generation until each of the encoder circuits has generated a binary bit output associated with a particular sampled value of the analog signal, whereupon all the stored binary bit outputs are simultaneously read out as a parallel digital word representative of the particular sampled value of the analog signal.

INVENTOR

JOHN A. SEVERIN

Jerry W. Mills

ATTORNEY

INVENTOR
JOHN A. SEVERIN
Jerry W. Mills
ATTORNEY

INVENTOR
JOHN A. SEVERIN

ATTORNEY

TECHNIQUE FOR HIGH SPEED ANALOG-TO-DIGITAL CONVERSION

This invention relates to analog-to-digital conversion, and more particularly to the high-speed conversion of an analog signal to a binary digital representation with a minimum of circuitry.

It is often desirable to convert the amplitude of either one analog signal, or the multiplexed combination of several analog signals, to digital signals representative of the amplitude of the analog signal. For instance, in the transmission of wide band information, a digital signal with an appropriate increase in bandwidth can be transmitted through a noisy medium and received with less signal degradation than an analog signal transmitted through the same medium with the same output power. Additionally, other advantages arise from the use of information in digital form due to the ease by which digital signals may be time division multiplexed, and due to the facility with which the digital signals may be stored and utilized by computers.

Typical applications of analog-to-digital conversion are found in the digital processing in real time of wide-band video signals originating from radar sensors, infrared sensors, television sensors, multiple acoustic sources or the like. Due to the bandwidth of these video sources, the amplitude sampling and conversion of the analog signals to digital values is often required to be performed at rates of 10 million or more samples and conversions per second.

A number of methods have been heretofore developed for achieving analog-to-digital conversion rates of 10 million or more conversions per second. One such method utilizes a plurality of parallel voltage comparators, each of which provides a digital output representative of a comparison of a sampled analog value and a different threshold voltage level. The combined outputs of the parallel voltage comparators result in a binary representation of the sampled value input level. While such systems are relatively satisfactory with respect to speed and accuracy of conversion, their application is severely limited by economic considerations since $2^{n-1}$ voltage comparators are required for coding a sampled analog signal to $n$ binary bits. Thus, a 10-bit encoding system constructed in accordance with this method would require 1,023 voltage comparator circuits, resulting in an almost prohibitively expensive system.

Another heretofore proposed successive approximation analog-to-digital converter has utilized tunnel diodes for voltage comparators and additionally for digital logic deciphering of the binary representation from the voltage comparators. A description of such a method is provided in The Solid State Circuit Conference Proceedings, Feb., 1961, pages 100—101. This technique utilizes a reasonable amount of hardware circuitry, but it is limited in accuracy and speed of operation. Additionally, design and testing problems become extremely complex at the required operating pulse rates of this technique. For example, a 10-bit encoding system operating at 10 million encoding cycles per second according to this technique would require the operation of analog switching, voltage comparison and digital logic at a rate in excess of 100 million combined operations per second.

In accordance with the present invention, an analog signal is periodically sampled and fed into a plurality of series connected encoder circuits. Each of the encoder circuits successively generates analog outputs representative of at least portions of the sampled values of the analog signal. Additionally, each of the encoder circuits successively generates binary bits representative of the relationship between portions of the sampled values of the analog signal and a preselected reference value. The binary bits are stored for various time intervals according to their order of generation and are then read out in parallel to form digital words representative of the sampled values of the analog signal.

In accordance with another aspect of the invention, each of the encoder circuits is identically constructed to provide both an analog output representative of a selected significant portion of an input analog signal and a digital output indicative of the relationship of an analog signal to a preselected reference level. Each of the encoder circuits utilizes two reference signals of equal amplitude and opposite polarity which are selectively fed to an output in dependence upon the relationship of the analog signal to the preselected level.

For a more complete understanding of the present invention and for further objects and advantages thereof, reference may now be had to the following description taken in conjunction with the accompanying drawings, in which.

Figures 1, 2:
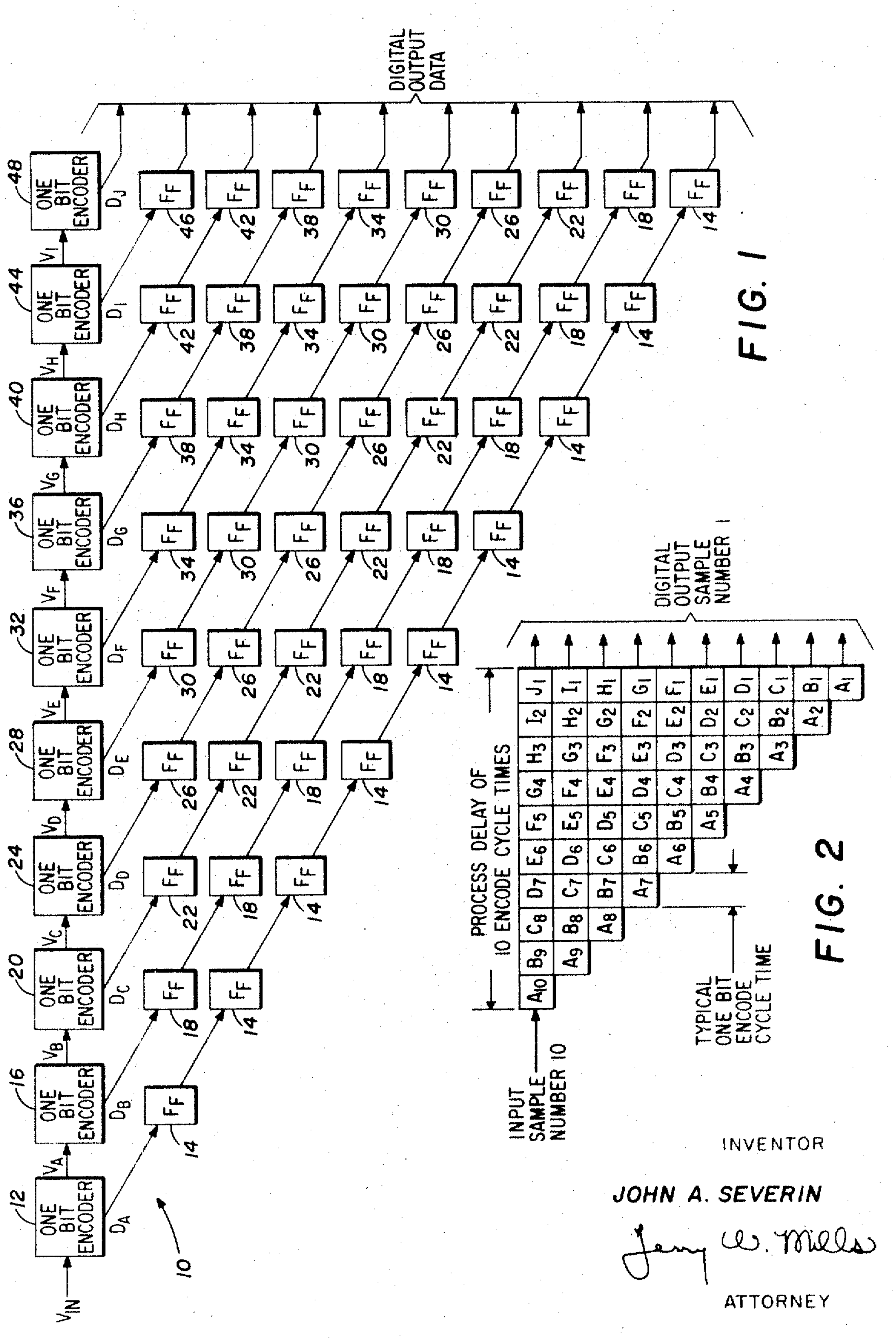
FIG. 1 illustrates a block diagram of a 10-bit analog-to-digital converter according to the invention.
FIG. 2 is a diagrammatic illustration of the flow path of signals through the system shown in FIG. 1.

Referring to FIG. 1, an analog-to-digital converter constructed in accordance with the invention is designated generally by the numeral 10. A sampled analog input, termed $V_{IN}$, is fed into a 1-bit encoder 12. Encoder 12 generates an analog output $V_A$ representative of $V_{IN}$ and also generates a digital bit output $D_A$ indicative of a most significant characteristic of $V_{IN}$. Output $D_A$ is fed into a chain of nine series connected flip-flop circuits 14. Flip-flop circuits 14 are identical and may comprise any one of a number of well-known circuits which may be switched between two discrete output levels in dependence upon the polarity of an input signal.

The analog output $V_A$ is fed into a second 1-bit encoder 16, which after an encoding cycle generates an analog output $V_B$ and a digital bit output $D_B$. Digital bit output $D_B$ is fed into a series chain of eight flip-flop circuits 18, while the analog output $V_B$ is fed into the input of a 1-bit encoder 20. After another encoding cycle, encoder 20 then generates both a digital bit output $D_C$ which is fed into a chain of seven series connected flip-flop circuits 22 and an analog output $V_C$ which is fed into a 1-bit encoder 24. After each encoding cycle, the digital bit outputs stored in the chains of flip-flop circuits are stepped to the next flip-flop circuit.

In a similar manner, after another encoding cycle encoder 24 feeds a digital bit output $D_D$ to six series connected flip-flop circuits 26 and an analog output $V_D$ to a fifth encoder 28. Encoder 28 then provides a digital bit output $D_E$ to five series connected flip-flop circuits 30 and an analog output $V_E$ to the input of a 1-bit encoder 32. A digital bit output $D_F$ is then fed from encoder 32 after an encoding cycle into four series connected flip-flop circuits 34, and an analog output $V_F$ is fed into a 1-bit encoder 36. Encoder 36 then provides a digital bit output $D_G$ to three series connected flip-flop circuits 38 and an analog output $V_G$ to an encoder 40, which after an encoding cycle generates a digital bit output $D_H$ to a pair of series connected flip-flop circuits 42 and an analog output $V_H$ to a 1-bit encoder 44. After another encoding cycle, encoder 44 generates a digital bit output $D_I$ to a single flip-flop circuit 46 and an analog output $V_I$ to a 1-bit encoder 48. The last 1-bit encoder 48 generates a digital bit output $D_J$ which is fed directly to a suitable digital readout circuit.

As will become apparent, the duration of each encoding cycle is equal to the sampling rate of the analog signal. Thus, after each 1-bit encoder operates upon a sampled value of the analog cycle, a signal representative of the next sampled value of the analog signal will be fed to the encoder. The system is thus capable of operating at the full sampling rate of the analog signal. The digital bit outputs representative of a particular sampled analog value are stored in flip-flop circuits for times related to their sequence of generation. For instance, the first digital bit output $D_A$ will be successively stored in the nine flip-flop circuits 14 for a time equal to the nine encoding cycles. $D_B$ will be successively stored in the eight flip-flop circuits 18 for a time equal to eight encoding cycles. Outputs $D_C$—$D_I$ will be stored for successively shorter time intervals.

Thus, upon the generation of output $D_J$, the outputs of each of the flip-flop circuits 14—46 located below the 1-bit encoder 48 generate digital bits in parallel to provide a parallel digital word representative of a particular sampled value of the analog input signal $V_{IN}$.

While a 10-bit digital representation system has been illustrated in FIG. 1, it will be understood that either a larger or smaller number of 1-bit encoders and flip-flop circuits may be selected to provide digital words having correspondingly more or less binary bits, as desired. For instance, in order to add one more binary bit to the final digital output data, another 1-bit encoder would be connected in series with the output of the 1-bit encoder 48, and 10 additional flip-flop circuits would be disposed directly below the additional 1-bit encoder, one of the flip-flops being connected to encoder 48 and each remaining flip-flop circuit being connected in series with one of the chains of existing flip-flop circuits.

For any number of output binary bits designated **10*n***, the required number of 1-bit encoders is *l* and the required number of flip-flop circuits is determined by evaluating the following equation:

$$\text{Number of flip-flop circuits} = \sum_{X=1}^{n-1} X. \quad (1)$$

Thus, for a system producing a 10 -bit binary digital representation of a sampled input signal, the number of 1 -bit encoders is 10 and the number of flip-flop circuits required is 45. This is in sharp contrast to the 1,023 comparative circuits required for many previously developed systems to provide the same 10 -bit output, at the same operational rate.

FIG. 2 illustrates diagrammatically the flow of signals through the system shown in FIG. 1, with the letters A—J representing the digital bits generated by the relative encoders and the subscripts representing the relative sampling cycle number. In the diagram, the letter A represents the most significant digital bit and the letter J represents the least significant digital bit, with the sampling cycle subscript 10 being the most recent sampling cycle and the sampling cycle subscript 1 being the earliest sampling cycle.

As previously described, each sampled value of the analog signal sequentially passes through each of the 1-bit encoders 12—48 at a rate of one encoding cycle per each 1-bit encoder. Each digital bit output generated in response to a particular sampled analog signal is sequentially fed through the respective chain of flip-flop circuits connected to the particular 1-bit encoder, until the digital bit output is finally read out as a portion of a digital word representative of the value of the particular sampled value of the analog signal. Upon inspection of FIG. 2, it will be seen that an additional digital bit representative of a less significant portion of a particular sampled value of the analog signal is added to the digital word being formed during each encoding cycle.

For instance, during the first encoding cycle for a particular $V_{IN}$, a single digital bit A is generated by the 1-bit encoder 12, in the position indicated in FIG. 2 as $A_{10}$. This digital bit is fed to and stored by the first of the flip-flop circuits 14 located beneath the 1-bit encoder 16, in the position indicated in FIG. 2 as $A_9$. Upon the second encoding cycle, a second binary bit B generated by the 1-bit encoder 16 is stored in the position designated as $B_8$ and the previously generated digital bit A is moved to position $A_8$. During the next encoding cycle time, the digital bits A and B are moved to respective positions $A_7$ and $B_7$, while a digital bit generated by encoder 20 is stored in position $C_7$. Upon the generation of a digital bit D, 4 binary bits are provided in parallel by the circuit. The process of adding an additional binary bit in parallel continues during each encoding cycle time, until, upon the generation of a digital bit J at the 10th encoding cycle, 10 binary bits are presented to form a digital word representative of the particular value of the sampled analog signal.

From the previous discussion and from an inspection of FIG. 2, it will be seen that additional sampled values $V_{IN}$ of the analog signal are fed into the 1-bit encoder 12 after each encoding cycle time, and thus 10 different digital words are ordinarily being formed by the system shown in FIG. 1 at any one instant of time. Hence, when the digital word comprising the binary bits $A_1$—$J_1$ is being read out, a second digital word having nine bits $A_2$—$I_2$ is being formed. Similarly, eight other digital words, each in successively varying states of formation, are being processed by the system. When the system is initially operated, 10 encoding cycles will elapse before a fully formed digital word is presented to the readout, and thereafter a different fully formed digital word will be presented to the readout at each successive encoding cycle. The unique configuration of the present system thus provides for encoding sequentially sampled values of an analog signal at the full encoding cycle rate of the 1-bit encoders of the system. Encoding rates provided by the present system are comparative to the operational rates of other analog-to-digital conversion systems requiring much more complex circuitry.

An important advantage of the invention is that each of the 1-bit encoder circuits is identical in construction, thereby enabling systems having different capabilities to be easily built, in addition to providing ease of component replacement.

Figure 3:
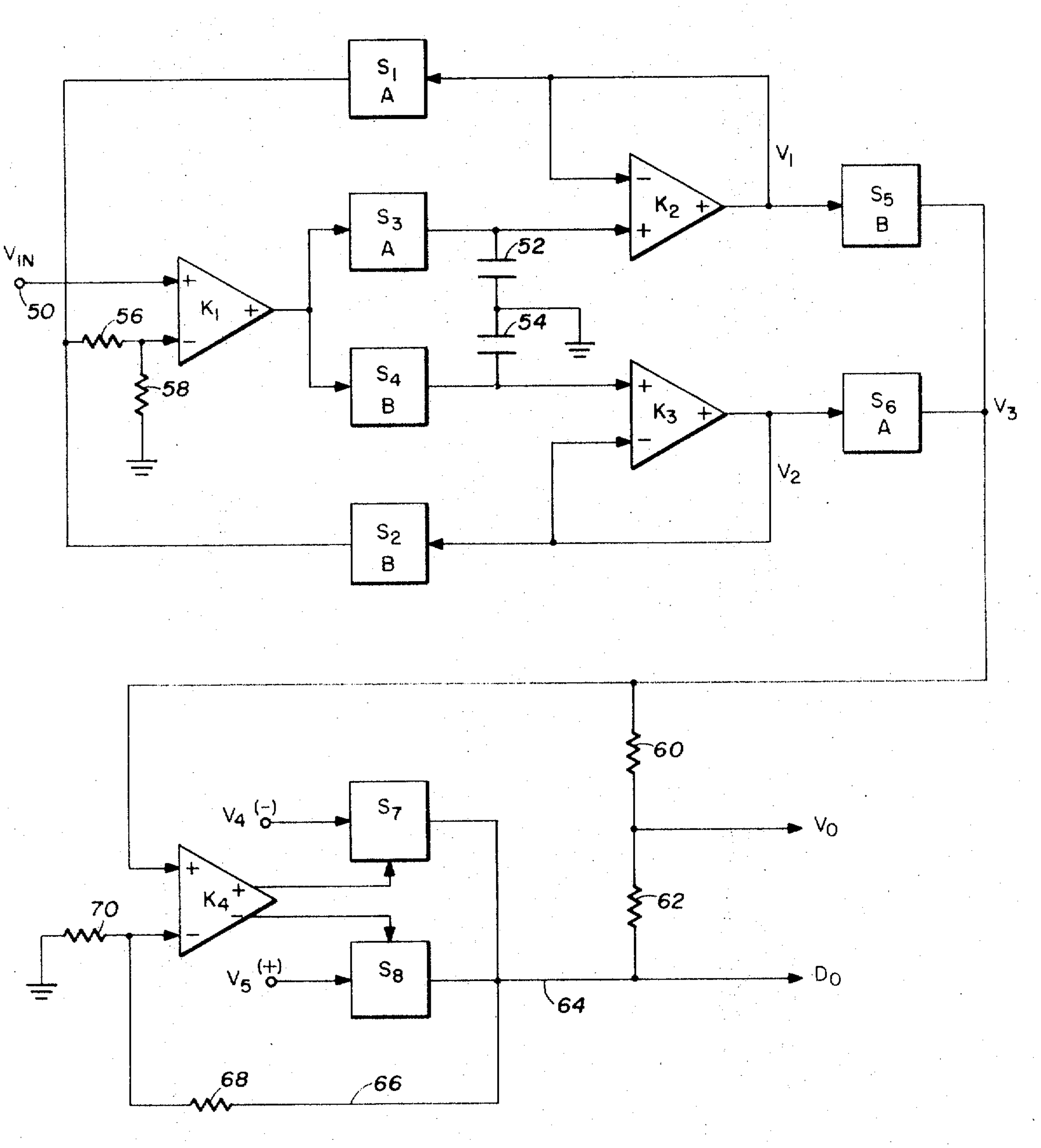
FIG. 3 is a block diagram of a typical 1-bit encoder circuits shown in FIG. 1.

FIG. 3 illustrates a block diagram of one of the 1-bit encoders of the invention, wherein an input voltage $V_{IN}$ is fed from an input terminal 50 to one input of a high input impedance current driver amplifier $K_1$. Amplifier $K_1$ comprises a high voltage gain, typically 60 db., differential input amplifier having a complementary emitter-follower output that can either supply or sink 50 to 100 milliamps of current. The output of amplifier $K_1$ is applied to switches $S_3$ and $S_4$, which are alternatively energized by suitable control circuitry. A pair of series connected capacitors 52 and 54 are connected across the outputs of switches $S_3$ and $S_4$, with the common terminals of the capacitors 52 and 54 being grounded.

A terminal of capacitor 52 is connected to the positive input of a buffer amplifier $K_2$, while a terminal of the capacitor 54 is connected to the positive input of a buffer amplifier $K_3$. Amplifiers $K_2$ and $K_3$ have essentially unity gain to prevent significant voltage change of the capacitors 52 and 54 during their storage periods. The output of the buffer amplifier $K_2$, termed $V_1$, is fed back to the negative input of the amplifier $K_2$ and also to a switch $S_1$. In a similar manner, the output of the buffer amplifier $K_3$, termed $V_2$, is fed back to the negative input of the amplifier $K_3$, and additionally to a switch $S_2$. Switches $S_1$ and $S_2$ are alternatively energized by a suitable control. The outputs of switches $S_1$ and $S_2$ are commonly connected to one terminal of a resistance 56. A resistance 58 is connected between the other terminal of the resistor 56 and ground to provide a voltage division network which is connected to the negative input of the amplifier $K_1$.

The outputs of amplifiers $K_2$ and $K_3$ are respectively also fed to switches $S_5$ and $S_6$, which are alternatively energized. The voltage appearing at the outputs of switches $S_5$ and $S_6$ is termed $V_3$ and is fed to a voltage division circuit comprised of two equal value resistances 60 and 62. The voltage $V_3$ equally divides across resistances 60 and 62 to provide an analog output $V_0$.

Additionally, the voltage $V_3$ is fed into the positive input of a comparator amplifier $K_4$. Amplifier $K_4$ compares the value of $V_3$ with ground potential. For values of $V_3$ above ground potential, the amplifier $K_4$ provides a control signal which opens a normally closed switch $S_7$. When switch $S_7$ is open, a constant amplitude negative reference voltage $V_4$ is fed through switch $S_7$ via a lead 64 to an output terminal at the lower terminal of resistance 62. The reference voltage $V_4$ appears at the output terminal as a negative binary bit output designated as $D_0$. Conversely, when the value of $V_3$ is below ground potential, amplifier $K_4$ divides a control voltage which opens a normally closed switch $S_8$ to provide a positive reference voltage $V_5$ via the lead 64 to the output terminal, wherein the reference voltage $V_5$ appears as a positive binary bit output.

The outputs of switches $S_7$ and $S_8$ are additionally fed back through a lead 66 and a resistance 68 to the negative input of the amplifier $K_4$. The feedback voltage is divided across resistance 68 and a resistance 70 connected to ground.

In operation of the 1-bit encoder shown in FIGURE 3, the switches $S_1$, $S_3$ and $S_6$, designated as A switches, are energized on alternate encoding cycles. Switches $S_2$, $S_4$ and $S_5$, designated as B switches, are energized during the alternate encoding cycles when the A switches are deenergized. The first sampled analog input $V_{IN}$ is fed into the positive input of the current driver amplifier $K_1$. When the A switches are energized, the capacitor 52 is charged up by the output of the amplifier $K_1$, with the buffer amplifier $K_2$ preventing substantial discharge from the capacitor 52. Voltage from the buffer amplifier $K_2$ is fed back through the switch $S_1$ to the voltage divider comprised of resistors 56 and 58. Capacitor 52 is charged until the buffered voltage $V_1$ becomes equal to the value determined by the relative magnitudes of the resistors 56 and 58, the preferred value being four times the magnitude of the sampled input analog signal.

When the capacitor 52 has been charged to the desired value, the charging of the capacitor 52 is terminated. Upon the next encoding cycle, the A switches are deenergized and the B switches are energized. The voltage stored upon capacitor 52 is then fed through the buffer amplifier $K_2$ and through the switch $S_5$ to appear as a voltage $V_3$. $V_3$ is fed to the upper terminal of the resistor 60 and also to the positive input of the comparator amplifier $K_4$.

At the same time, the next sampled input analog voltage $V_{IN}$ is fed through the amplifier $K_1$ through the switch $S_4$ to charge up the capacitor 54. Voltage $V_2$ is fed back through the buffer amplifier $K_3$ and through the switch $S_2$ to the voltage divider resistors 56 and 58. In the preferred embodiment, capacitor 54 is charged to a value equal to four times the magnitude of the particular sampled input analog signal. When this level is reached, further charging of the capacitor 54 is terminated. On the next encoding cycle, the B switches are deenergized and the A switches are energized. The multiplied voltage appearing across capacitor 54 is fed through the buffer amplifier $K_3$ and the switch $S_6$ to appear as voltage $V_3$. $V_3$ is fed to amplifier $K_4$ and is also divided across resistors 60 and 62 to appear as the output analog voltage $V_0$. Capacitor 52 is again charged up to a value equal to four times the next sampled input analog signal, and the cycle is again repeated.

Each time the multiplied voltage $V_3$ is applied to the input of the comparator amplifier $K_4$, voltage $V_3$ is compared with ground potential. If the voltage $V_3$ is above ground potential, switch $S_7$ is energized and the negative reference voltage $V_4$ is fed to lead 64 to appear as $D_0$. The negative voltage $V_4$ represents a logical "1" digital output, and additionally is a negative voltage reference for the bottom terminal of the resistor 62. For input values of $V_3$ below ground potential, the switch $S_8$ is energized and the positive reference voltage $V_5$ is selected for the digital output $D_0$, and for a positive voltage reference for the resistor 62. This positive voltage represents a logical "0" digital output.

An important aspect of the invention is the multiplication of the sampled input analog signal $V_{IN}$ by four and the subsequent halving of the multiplied voltage $V_3$ across the voltage divider comprising the equal resistances 60 and 62. As will later be described, this effectively provides a gain of two for the slope of the transfer function of each 1 -bit encoder. The magnitude of the reference voltages $V_4$ and $V_5$ are equal, but the voltages have opposite polarities. In a preferred embodiment, the magnitude of the reference voltages $V_4$ and $V_5$ is selected as twice the full scale voltage applied as the analog voltage $V_{IN}$. For example, if the input analog voltage $V_{IN}$ varies between ±5 volts, reference voltage $V_4$ is set as −10 volts and reference voltage $V_5$ is set as +10 volts. It will be understood that the values of $V_4$ and $V_5$ can be changed to operate on different input ranges.

Another important feature of the invention is the feedback loop to the negative input of amplifier $K_4$ comprising lead 66 and resistors 68 and 70. This feedback loop provides sharp switching action when transistors are used for switches $S_7$ and $S_8$. With the use of transistor switches, the magnitudes of the resistors 68 and 70 are selected such that the output of the comparator amplifier $K_4$ will not be reduced below the value required to saturate the transistor switch $S_7$ until the voltage $V_3$ is below ground potential. At the level of the input voltage where transistor switch $S_7$ begins to become unsaturated, the output voltage $D_0$ will be reduced from the voltage value $V_4$, and the feedback voltage via lead 66 will be correspondingly reduced.

This effective positive feedback will cause an even further reduction of the voltage applied to the transistor switch $S_7$, which will in turn cause less feedback voltage to very quickly deenergize the transistor switch $S_7$. This action will rapidly continue until the output voltage of the comparator amplifier $K_4$ is negative and a positive voltage can be applied from the output of comparator amplifier $K_4$ to energize the transistor switch $S_8$. Full Saturation of the transistor switch $S_8$ is thus quickly assured, since the value of the voltage $V_3$ has to be negative to initiate the switching action. The circuit provides two stable digital output states with sharp switching action provided by the positive feedback.

Although with the encoder circuit shown in FIG. 3 a binary output may be obtained with a minimum of circuitry, the invention is not limited to the use of a particular encoder circuit. For instance, a plurality of voltage comparator circuits may be connected in series, and an input analog signal sequentially applied to each comparator circuit and compared with a different threshold voltage. The digital outputs provided could be delayed in the manner shown until the entire digital word was read out in parallel. Additionally, other encoding representations than binary could be provided by suitable circuitry.

Figure 4:
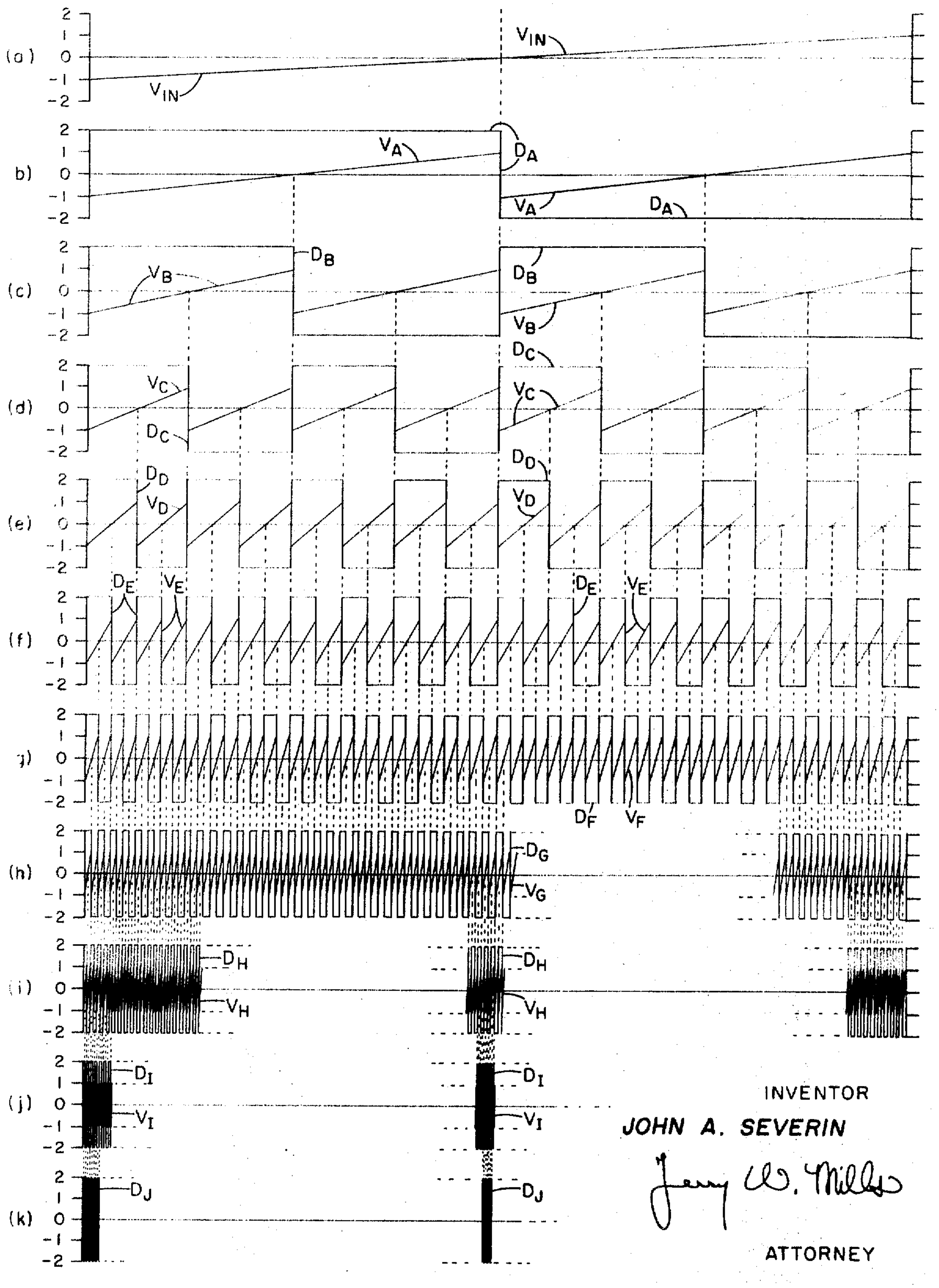
FIGS. 4*a*—4*k* are transfer function waveforms illustrating the operation of successive ones of the 1-bit encoders shown in FIG. 1.

FIG. 4*a* is a graph of the transfer function of $V_{IN}$ which ranges from +1 volt to −1 volt in amplitude when applied to the input of the system shown in FIG. 1. FIGS. 4*b*—4*k* are graphs of transfer functions of both the resulting analog output signals and digital output signals from each of the 1-bit encoders in the system shown in FIG. 1 when the input analog signal $V_{IN}$ of FIG. 4*a* is applied. For ease of illustration, only portions of the waveforms in FIGS. 4*h*—4*k* have been shown.

The operation of the system shown in FIG. 1 may be understood by picking a particular voltage level on the curve $V_{IN}$ shown in FIG. 4*a*, and picking the points on the remaining transfer functions which are directly beneath the selected voltage level. For instance, for a voltage $V_{IN}$ of −1 volt, the 1-bit encoder 12, shown in FIG. 1, will produce a digital bit output $D_A$ equal to +2 volts, thereby representing a zero binary level. Additionally, the encoder 12 will generate an analog output $V_A$ equal to −1 volt which is fed to the 1-bit encoder 16. Encoder 16 also generates a binary bit $D_B$ equal to +2 volts, or a binary output of zero, and an analog equal to −1 volt. Similarly, the next encoder 20 generates a binary bit output $D_C$ equal to +2 volts, or a zero output, and an analog output $V_C$ equal to −1. By further inspection of the remaining transfer functions shown in FIGS. 4*e*—4*k*, it will be seen that each of the remaining encoders 24—48 also generates binary bit outputs of +2 volts and an analog output of −1 volt.

In accordance with the previous discussion of the operation of the system shown in FIG. 1, it will be understood that each of the binary bit outputs $D_A$—$D_J$ are stored in the flip-flop circuits for times dependent upon the order of their generations. Upon the generation of the binary bit $D_J$, all 10 binary bit outputs $D_A$—$D_J$ are simultaneously presented as a parallel digital word. In the particular case of a sampled input analog signal $V_{IN}$ of −1 volt, each of the binary bit outputs will be equal to a binary zero level, thereby providing a digital word of 0000000000. As −1 volt is the most negative voltage to be input into the system, this digital word is a correct indication of the level of the particular sampled analog input signal.

In the case of the 10-bit encoder system shown in FIG. 1, the system can output 1,024 different digital words each descriptive of a different level of the sampled input analog signal. Of course, if greater accuracy is desired, more encoder stages could be added to the system shown in FIG. 1.

Taking another example wherein a sampled input analog signal $V_{IN}$ equal to +1 volt is fed to the system shown in FIG. 1, it will be seen from the graphs 4b—4k that each of the 1-bit encoders generates an analog output equal to +1 volt and an output digital signal equal to −2 volts, or a binary one level. Thus, after 10 encoding cycles, a 10-bit binary word 1111111111 will be generated. This binary word indicates that the level of the sampled input analog signal $V_{IN}$ is at the highest level within the input range of the signal $V_{IN}$, which in this case is +1 volt. It will be understood that by picking any other point along the function $V_{IN}$ shown in FIG. 4a and then determining the values of the binary bit outputs $D_A$—$D_J$ directly beneath the selected point, that the value of the digital word for that level of the voltage $V_{IN}$ will be provided.

From an inspection of the drawings 4b—4k, it will be seen that the slope of the analog outputs is increased by a factor of two for each successive 1-bit encoder. For instance, the slope of the analog output $V_B$ is twice that of the analog output $V_A$. This increase in the rate of change of the transfer functions is an important aspect of the invention, in that it allows the generation of a binary output without complex encoding circuitry. The cause of the multiplication of the slope of the transfer function by each 1-bit encoder has previously been described, and is due to the multiplication of the voltage $V_{IN}$ by four and the subsequent division of the multiplied voltage by two across a dividing network. The multiplication of the slope of the transfer functions causes the digital outputs $D_0$ to change states twice as often, thus causing each 1-bit encoder to operate on a less significant portion of the analog signal than the preceding encoder.

In order to more clearly understand the operation of a single 1-bit encoder circuit, consider a voltage $V_{IN}$ applied to terminal 50 of the circuit shown in FIG. 3, in a system wherein the full range of the voltage $V_{IN}$ ranges between +1 volt and −1 volt. If a voltage equal to −1 volt is applied to the terminal 50, a voltage equal to −4 volts will be stored upon one of the capacitors 52 or 54 and subsequently transferred as voltage $V_3$ to the input of the comparator amplifier $K_4$ and to one terminal of the resistor 60.

As the voltage $V_3$ is equal to −4 volts, amplifier $K_4$ operates switch $S_8$ to provide the voltage $V_5$ via lead 64 as the output $D_0$. The value of the voltage $V_5$ is twice the positive level of the range of the input signal $V_{IN}$, and is therefore +2 volts. $D_0$ thus equals +2 volts, or a binary zero output, as illustrated in the transfer function shown in FIG. 4b. Voltage $V_3$ equal to −4 volts is applied to the upper terminal of the resistor 60, while voltage $V_5$ equal to +2 volts is applied to the lower terminal of resistor 62. Therefore, a voltage of −1 volt with reference to ground is seen as the analog output $V_0$.

In a similar fashion, if an input analog voltage $V_{IN}$ equal to +1 volt is applied to the circuit shown in FIG. 3, a voltage equal to +4 volts will be stored upon one of the capacitors 52 or 54 and fed as voltage $V_3$ to the input of the comparator amplifier $K_4$. Switch $S_7$ will then be opened to feed the reference voltage $V_4$, which has a magnitude equal to −2 volts, or a binary one output, via the lead 64 to appear as the digital bit output $D_0$. This output corresponds with the digital output shown in FIG. 4b for an input voltage $V_{IN}$ of +1 volt. As a voltage $V_3$ equal to +4 volts is applied to the upper terminal of the resistor 60, and a voltage equal to −2 volts is applied to lower terminal of the resistor 62, an analog output signal $V_0$ equal to +1 volt is provided at $V_0$.

Other levels of the input analog voltage $V_{IN}$ will be operated upon by the 1-bit encoder circuits in the same manner, and further explanation is not deemed necessary. It is also understood that input analog voltages having differing amplitudes can be operated upon by the system shown in FIG. 1, with only changes in the values of the reference voltages $V_4$ and $V_5$ being required.

Whereas a specific embodiment of the invention has been described in detail in the specification, it is to be understood that changes and modifications may be suggested to one skilled in the art, and such changes and modifications are intended to be encompassed by the appended claims.

What I claim is:

1. A system for converting an analog signal to a digital signal comprising:

a plurality of identical encoder circuits connected in series for sequentially operating upon an analog signal fed therethrough, means in each said encoder circuit for multiplying the analog signal by a predetermined gain such that the succeeding encoder circuit will operate on a less significant portion of the analog signal, binary means associated with each said encoder circuit for generating a control signal in response to a comparison of the analog signal to a reference level, a source of two reference signals having equal amplitudes and opposite polarities, switch means for connecting one of said reference signals to the output of said encoder circuit in response to said control signal, series chains of flip-flop circuits connected to the output of each of said encoder circuits for storing said reference signals, the number of flip-flop circuits connected to each encoder circuit varying in dependence upon the significance of the analog signal operated upon by the encoder circuit, the first encoder circuit receiving the analog signal operating upon the most significant portion and having the largest number of flip-flop circuits connected to the output thereof, means connected to simultaneously receive the digital signals stored in said chain of flip-flop circuits, a pair of capacitors, circuitry to selectively isolate said capacitors, circuitry for selectively feeding said sampled analog signal alternatively to each of said capacitors for storage thereof, circuitry for multiplying the stored sampled analog signals, and circuitry for selectively feeding said sampled analog signal from each of said capacitors to said means for generating a control signal.